United States Patent
Hwangbo et al.

(10) Patent No.: US 12,194,422 B1
(45) Date of Patent: Jan. 14, 2025

(54) NANOPARTICLE ULTRASONIC DISPERSION DEVICE AND NANOPARTICLE ULTRASONIC DISPERSION METHOD THEREOF

(71) Applicant: FUST LAB. CO., LTD., Daejeon (KR)

(72) Inventors: Minsung Hwangbo, Daejeon (KR); Sang Mann Lee, Daejeon (KR); A Reum Lee, Daejeon (KR)

(*) Notice: Subject to any disclaimer, the term of this patent is extended or adjusted under 35 U.S.C. 154(b) by 0 days.

(21) Appl. No.: 18/889,467

(22) Filed: Sep. 19, 2024

Related U.S. Application Data

(63) Continuation-in-part of application No. PCT/KR2023/013175, filed on Sep. 4, 2023.

(30) Foreign Application Priority Data

Aug. 10, 2023 (KR) .................. 10-2023-0104712

(51) Int. Cl.
- *B01F 23/50* (2022.01)
- *B01F 31/80* (2022.01)
- *B01F 31/85* (2022.01)

(52) U.S. Cl.
CPC ............ *B01F 31/85* (2022.01); *B01F 23/551* (2022.01); *B01F 31/84* (2022.01)

(58) Field of Classification Search
CPC .................. B01F 23/551; B01F 31/84
USPC .................................................. 366/127
See application file for complete search history.

(56) References Cited

U.S. PATENT DOCUMENTS

| | | | | |
|---|---|---|---|---|
| 7,622,510 B2 * | 11/2009 | Arnaud | .................. | B01F 23/49 |
| | | | | 516/53 |
| 2017/0014788 A1 * | 1/2017 | Chu | ...................... | B01F 23/405 |

FOREIGN PATENT DOCUMENTS

| | | |
|---|---|---|
| KR | 20110053775 A | 5/2011 |
| KR | 101514034 B1 | 4/2015 |
| KR | 101514035 B1 | 4/2015 |
| KR | 20190076819 A | 7/2019 |
| KR | 102251236 B1 | 5/2021 |
| KR | 20210099950 A | 8/2021 |

\* cited by examiner

*Primary Examiner* — David L Sorkin
(74) *Attorney, Agent, or Firm* — NKL LAW; Byungwoong Park

(57) ABSTRACT

A nanoparticle ultrasonic dispersion device according to an exemplary embodiment of the present invention includes: a device housing including a cylindrical body having an inlet through which a dispersion medium flows in and an outlet through which the dispersion medium after a dispersion work is completed flows out, and provided with a cooling water moving part through which cooling water flows in a center of the body and a dispersion phase moving part provided parallel to the cooling water moving part, a dispersion phase flowing through the dispersion phase moving part; and a focusing-type ultrasonic forming part provided to surround a central portion of the cooling water moving part on the device housing and configured to generate an ultrasonic wave to disperse the dispersion phase into the dispersion medium.

10 Claims, 5 Drawing Sheets

NANOPARTICLE ULTRASONIC DISPERSION DEVICE AND NANOPARTICLE ULTRASONIC DISPERSION METHOD THEREOF

TECHNICAL FIELD

The present invention relates to a nanoparticle ultrasonic dispersion device and a nanoparticle ultrasonic dispersion method thereof, and more specifically, to a nanoparticle ultrasonic dispersion device and a nanoparticle ultrasonic dispersion method thereof capable of enabling effective dispersion of a dispersion phase by providing the dispersion phase while simultaneously providing ultrasonic waves to a dispersion medium, making it possible to allow mass dispersion and shorten a time required for dispersion to increase process efficiency.

BACKGROUND ART

With the development of nanotechnology, nano-powder can be produced by various methods such as an arc discharge method, a gas deposition method, a sputtering method, and a freeze grinding method.

However, since these nanoparticles are likely to agglomerate together, it is necessary to properly disperse the nanoparticles during or after manufacturing. In particular, when mixing nanoparticles in a certain fluid, such as products, for example, paints, inks, shampoos, beverages, and polishes, dispersion of nanoparticles is an essential process.

Accordingly, a method for dispersing nanoparticles included in a fluid includes a method using ultrasonic waves. Nano-powder dispersion methods using ultrasonic waves include a bath-type method, horn-type method, and focusing-type method.

Among these, the focusing-type method has the advantage of being able to obtain a more uniform dispersion effect, but due to characteristics of a device, it is difficult to disperse nano-powder in large quantities and an optimal dispersion effect may not be obtained.

A nano-powder dispersion device according to an exemplary embodiment of the prior art may include a fluid pipe through which a fluid including nano-powder passes, an accommodation structure provided to surround the fluid pipe and having a hole through which cooling water is injected and discharged, and an ultrasonic vibrator that generates ultrasonic waves to disperse nano-powder.

However, such a nanoparticle dispersion device of the related art is a central focusing type and can disperse even nanoparticles, but since dispersion is possible only in one section, it requires a considerable amount of time to disperse the nanoparticles, which reduces efficiency.

Therefore, there is a need for development of a nanoparticle ultrasonic dispersion device and method with a new configuration capable of accurately dispersing nanoparticles and shortening a time required for dispersion to increase process efficiency.

The related art is disclosed in Korean Patent No. 10-1514035 (Titled: Nano-Powder Dispersion Device and Method).

SUMMARY

Technical Problem

An exemplary embodiment of the present invention is to provide a nanoparticle ultrasonic dispersion device and a nanoparticle ultrasonic dispersion method thereof capable of enabling effective dispersion of a dispersion phase by providing the dispersion phase while simultaneously providing ultrasonic waves to a dispersion medium, making it possible to shorten a time required for dispersion to increase process efficiency.

The problem to be solved by the present invention is not limited to the above-described problem(s), and other problem(s) not described will be apparently understood by one skilled in the art from the following description.

Technical Solution

A nanoparticle ultrasonic dispersion device according to an exemplary embodiment of the present invention includes: a device housing including a cylindrical body having an inlet through which a dispersion medium flows in and an outlet through which the dispersion medium after a dispersion work is completed flows out, and provided with a cooling water moving part through which cooling water flows in a center of the body and a dispersion phase moving part provided parallel to the cooling water moving part, a dispersion phase flowing through the dispersion phase moving part; and a focusing-type ultrasonic forming part provided to surround a central portion of the cooling water moving part on the device housing and configured to generate an ultrasonic wave to disperse the dispersion phase into the dispersion medium.

In addition, the device according to an exemplary embodiment of the present invention may include a dispersion concentration part provided to partially surround the cooling water moving part within the device housing and configured to accelerate the dispersion of the dispersion phase by the ultrasonic forming part, and the dispersion phase moving part may penetrate the dispersion concentration part, enabling the dispersion phase moving through the dispersion phase moving part to be dispersed into the dispersion medium through the dispersion concentration part.

In addition, according to an exemplary embodiment of the present invention, the dispersion concentration part may be made of a material having pores, and the dispersion phase moving along the dispersion phase moving part may be provided into the dispersion medium while passing through the dispersion concentration part, making it possible to accelerate the dispersion of the dispersion phase into the dispersion medium.

In addition, according to an exemplary embodiment of the present invention, the dispersion concentration part may be provided at a side with a net made of a material having pores, enabling the dispersion phase moving through the dispersion phase moving part to be spread through the net and transferred into the dispersion medium.

In addition, according to an exemplary embodiment of the present invention, when the dispersion medium flowing into the device housing through the inlet passes between the ultrasonic forming part and the dispersion concentration part, while the dispersion phase is dispersed into nanoparticles by the ultrasonic wave generated by the ultrasonic forming part, the dispersion phase dispersed through the dispersion concentration part may accelerate the dispersion into the nanoparticles in the dispersion medium.

In addition, according to an exemplary embodiment of the present invention, the dispersion concentration part may be made of a material having uniform pores of 10 μm or greater and 100 μm or less.

In addition, according to an exemplary embodiment of the present invention, the cylindrical body may be provided in a hollow cylindrical shape where the cooling water moving part penetrates the center, the ultrasonic forming part may be provided in a cylindrical shape to surround the central portion of the cylindrical body, and an inner diameter of an internal space of the cylindrical body to which the ultrasonic forming part is mounted may be relatively larger than an inner diameter of an internal space of the cylindrical body where the inlet and the outlet are provided.

In addition, according to an exemplary embodiment of the present invention, the ultrasonic forming part may include a PZT vibrator.

In addition, according to an exemplary embodiment of the present invention, a specific gravity of the dispersion medium may be different from a specific gravity of the dispersion phase.

In addition, according to an exemplary embodiment of the present invention, a material of the dispersion medium may be of a different type from a material of the dispersion phase.

In addition, a nanoparticle ultrasonic dispersion method of the nanoparticle ultrasonic dispersion device according to an exemplary embodiment of the present invention may include causing a dispersion medium to flow in through the inlet of the device housing; dispersing the dispersion phase into the dispersion medium by operating the ultrasonic forming part to generate an ultrasonic wave on a moving path of the dispersion medium formed in the device housing; and causing the dispersion medium containing nanoparticles dispersed by the ultrasonic forming part to flow out through the outlet of the device housing, wherein in the dispersing, the dispersion phase moving through the dispersion phase moving part may be provided into the dispersion medium through the dispersion concentration part to accelerate the dispersion of the dispersion phase by the ultrasonic forming part.

In addition, according to an exemplary embodiment of the present invention, the dispersion concentration part may be made of a material having pores, and in the dispersing, while the dispersion phase moving along the dispersion phase moving part passes through the dispersion concentration part, the dispersion of the dispersion phase is accelerated.

In addition, according to an exemplary embodiment of the present invention, in the causing a dispersion phase to flow in, a cooling process for the dispersion phase that is dispersed within the device housing in the dispersing may be performed by providing cooling water through the cooling water moving part.

In addition, according to an exemplary embodiment of the present invention, a specific gravity of the dispersion medium may be different from a specific gravity of the dispersion phase.

In addition, according to an exemplary embodiment of the present invention, a material of the dispersion medium may be of a different type from a material of the dispersion phase.

Advantageous Effects

According to an exemplary embodiment of the present invention, dispersion in the dispersion medium can be efficiently achieved by providing ultrasonic waves to the dispersion medium and simultaneously providing the dispersion phase through the dispersion concentration part. With this, the time required for dispersion can be shortened to increase process efficiency.

DETAILED DESCRIPTION OF EXEMPLARY EMBODIMENTS

Figure 1:
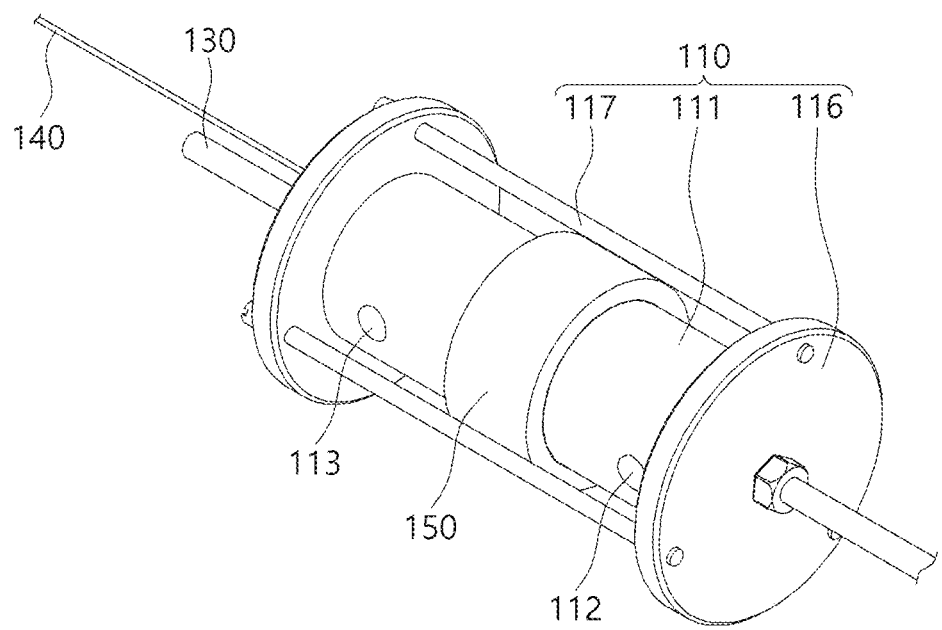
FIG. 1 is a perspective view of a nanoparticle ultrasonic dispersion device according to an exemplary embodiment of the present invention.

The advantages and/or features of the present disclosure, and a method for achieving the same will become apparent with reference to exemplary embodiments described in detail below together with the accompanying drawings. However, the present invention is not limited to Examples disclosed below, but can be implemented in a variety of different forms. The Examples are provided to only complete the disclosure of the present invention and to allow one skilled in the art to completely understand the category of the present invention. The present invention is only defined by the category of the claims. Like reference numerals indicate like constituent elements throughout the specification.

Hereinafter, exemplary embodiments of the present invention will be described in detail with reference to the accompanying drawings.

Figure 2:
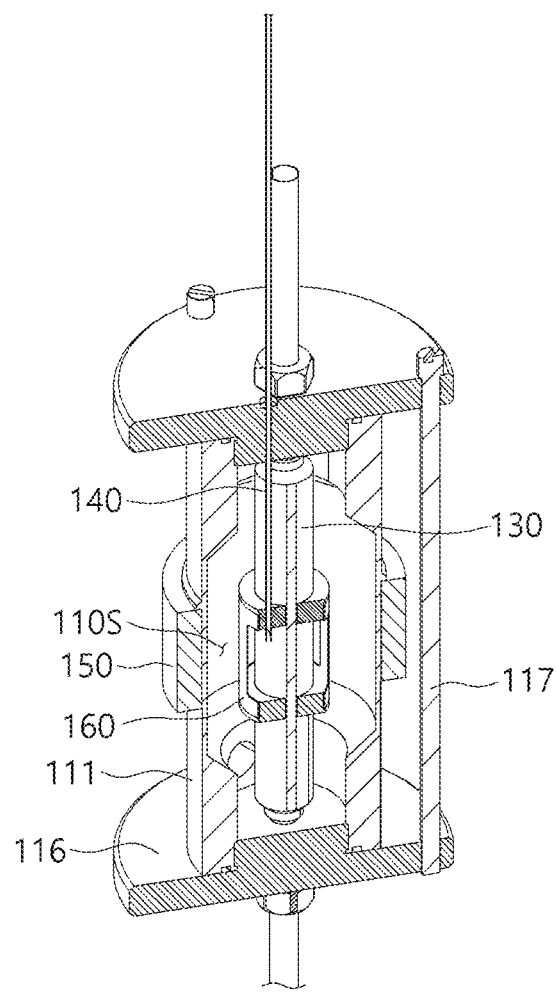
FIG. 2 is a perspective view partially cross-sectioned to illustrate an internal configuration of the device shown in FIG. 1.
Figure 3:
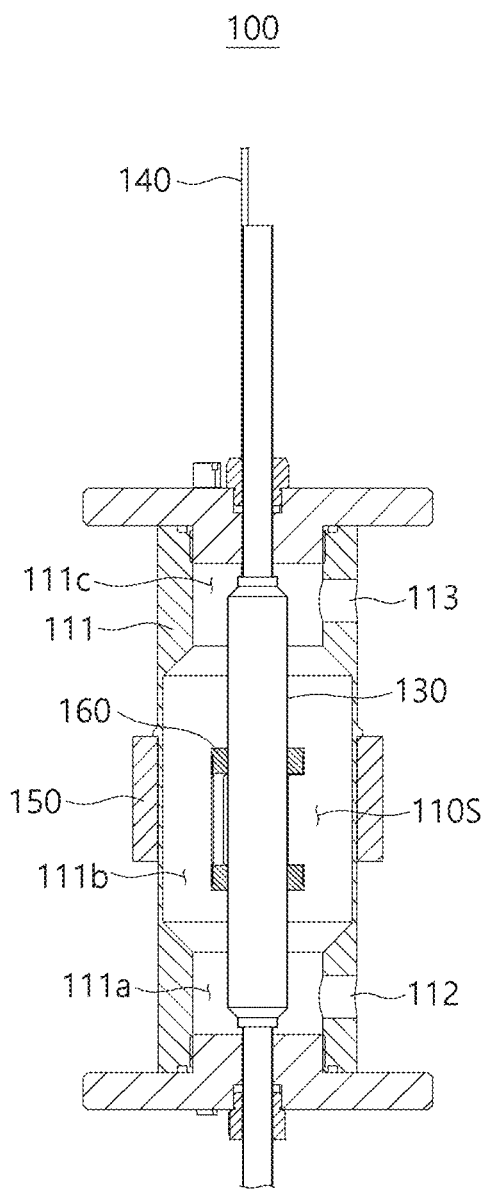
FIG. 3 is a front cross-sectional view of the device of FIG. 1.
Figure 4:
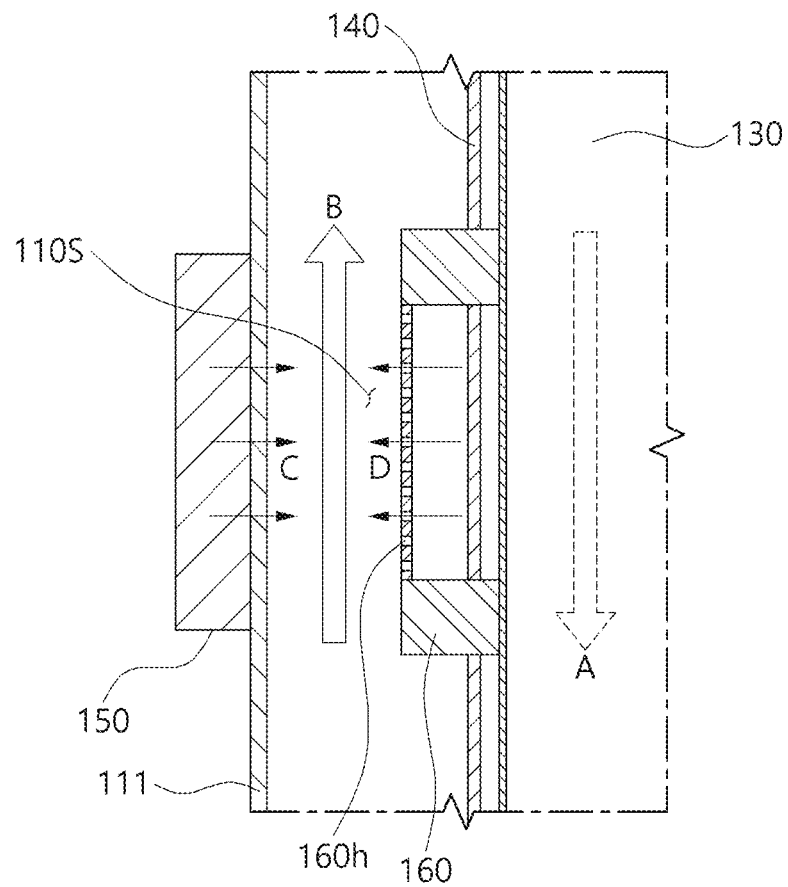
FIG. 4 is a diagram for illustrating a dispersion process of a dispersion phase into nanoparticles performed within the device of FIG. 1.

FIG. 1 is a perspective view of a nanoparticle ultrasonic dispersion device according to an exemplary embodiment of the present invention, FIG. 2 is a perspective view partially cross-sectioned to illustrate an internal configuration of the device shown in FIG. 1, FIG. 3 is a front cross-sectional view of the device of FIG. 1, and FIG. 4 is a diagram for illustrating a dispersion process of a dispersion phase into nanoparticles performed within the device of FIG. 1.

As shown in these drawings, a nanoparticle ultrasonic dispersion device 100 according to an exemplary embodiment of the present invention may include a device housing 110 forming a body having an inlet 112 through which a dispersion medium flows in and an outlet 113 through which the dispersion medium after a dispersion work is completed flows out, and provided with a cooling water moving part 130 through which cooling water moves and a dispersion phase moving part 140 through which a dispersion phase flows; and an ultrasonic forming part 150 mounted to the device housing 110 and configured to generate an ultrasonic wave to disperse the dispersion phase into nanoparticles in the dispersion medium.

In addition, the device 100 of the present exemplary embodiment may include a dispersion concentration part 160 mounted within the device housing 110 to accelerate dispersion of the dispersion phase by the ultrasonic forming part 150.

With this configuration, dispersion of the dispersion phase can be efficiently achieved by providing ultrasonic waves to the dispersion medium and simultaneously providing the dispersion phase through the dispersion concentration part 160.

Describing each configuration, the device housing 110 of the present exemplary embodiment forms a basic frame of the device, and as shown in FIGS. 1 to 3, may include a cylindrical body 111 provided in a hollow cylindrical shape as a whole, a pair of disc-shaped blocking plates 116 that block both openings of the cylindrical body 111, and a fixing member 117 for fixing the pair of blocking plates 116 with respect to the cylindrical body 111 by connecting the pair of blocking plates 116 to each other.

Here, the fixing member 117 may be mounted, for example at three positions spaced apart from each other by 120° intervals, thereby making it possible to firmly couple the pair of blocking plates 116 with respect to the cylindrical body 111.

As shown in FIG. 1, the cylindrical body 111 may be provided with an inlet 112 through which a dispersion medium flows in, and an outlet 113 through which the dispersion medium after a dispersion work is completed flows out, and as shown in FIG. 2, the inlet 112 and the outlet 113 may be communicated with each other through an internal space of the cylindrical body 111.

That is, the dispersion medium flowing into the inlet 112 moves in the form of a fluid along a moving path formed within the cylindrical body 111, and a dispersion phase is dispersed in nanoparticle size in the dispersion medium by the ultrasonic forming part 150 and the dispersion concentration part 160, which will be described below, and then the dispersion medium including the dispersion phase may be caused to flow out to the outside through the outlet 113.

Furthermore, a specific gravity of the dispersion medium in the present exemplary embodiment is different from a specific gravity of the dispersion phase, and a material of the dispersion medium may be of a different type from a material of the dispersion phase.

Specifically, the inlet 112 and outlet 113 of the cylindrical body 111 of the present exemplary embodiment may have a circulation structure, through which the dispersion medium flowing in through the inlet 112 may be circulated.

In addition, the dispersion phase and the dispersion medium may be implemented as liquids, and the device according to the present invention may be used as a device to produce an emulsion in which one liquid is micronized and dispersed in another liquid.

In addition, a dispersion phase having a different specific gravity from that of the dispersion medium is introduced into the dispersion medium by the dispersion concentration part 160, which will be described below. At this time, ultrasonic waves are irradiated through the ultrasonic forming part 150 at a point where the dispersion medium and the dispersion phase with different specific gravities meet, thereby achieving efficient dispersion of the dispersion medium.

Although not shown, for example, a pump may be provided on a path connected to the outlet 113, and a flow from the inlet 112 to the outlet 113 may be formed by force provided from the pump. As described above, the circulation structure may be formed or not.

The cooling water moving part 130 through which cooling water flows may be provided at the center of the cylindrical body 111 of the device housing 110, that is, at the axial center. Although not shown, cooling water can be continuously supplied from a cooling water supply unit to the cooling water moving part 130. With this, the dispersion medium introduced into the cylindrical body 111 can be cooled, making it possible to achieve a more efficient dispersion process of nanoparticles.

In particular, the cooling water moving part 130 is provided at the axial center of the cylindrical body 111, and the ultrasonic forming part 150 is provided so as to be spaced apart from the cooling water moving part 130. With this, the ultrasonic waves provided from the ultrasonic forming part 150 are provided directly into the dispersion medium without passing through the cooling water moving part 130, resulting in improvement in dispersion efficiency of the dispersion phase.

In addition, the cylindrical body 111 may be provided with a dispersion phase moving part 140 provided parallel to the cooling water moving part 130 at a position slightly spaced apart from the cooling water moving part 130, as shown in FIGS. 1 and 2.

For example, the dispersion phase such as oil is moved along an internal path of the dispersion phase moving part 140, and the dispersion phase moving through the dispersion phase moving part 140 is divided into fine sizes through the dispersion concentration part 160, which will be described below, and may be then provided into a dispersion region 110S where dispersion in the dispersion medium is taking place.

Note that the ultrasonic forming part 150 of the present exemplary embodiment is provided to surround a central portion of the cooling water moving part 130 of the cylindrical body 111 of the device housing 110, as shown in FIGS. 1 to 3, and generates ultrasonic waves, making it possible to disperse the dispersion phase, which passes through the dispersion region 110S between the ultrasonic forming part 150 and the dispersion concentration part 160 to be described below within the cylindrical body 111, in a fine size into the dispersion medium.

Additionally describing, the ultrasonic forming part 150 is of a focusing type and can convert electrical energy into ultrasonic energy and provide the ultrasonic energy to nanopowder. The ultrasonic forming part 150 of the present exemplary embodiment may be provided as, for example, a PZT vibrator, but is not limited thereto.

Referring to FIG. 1, the ultrasonic forming part 150 of the present exemplary embodiment has a cylindrical shape and may be provided on the central portion of the cylindrical body 111. Referring to FIG. 3, an internal space of the cylindrical body 111 on which the ultrasonic forming part 150 is mounted has a hollow cylindrical shape as a whole, and inner diameters of the cylindrical body 111 are different in sections 111*a* and 111*c* where the inlet 112 and the outlet 113 are provided and a section 111*b* where the ultrasonic forming part 150 is provided.

That is, the inner diameter of the cylindrical body 111 in the sections 111*a* and 111*c* where the inlet 112 and the outlet 113 are provided is smaller than that of the cylindrical body 111 in the section 111*b* where the ultrasonic forming part 150 is provided, and interconnecting sections are inclined so that the dispersion medium introduced through the inlet 112 can diffuse in an internal space of the cylindrical body 111 on which the ultrasonic forming part 150 is provided. Thereafter, the dispersion medium including the dispersion phase subjected to the dispersion process may pass through the relatively smaller internal section of the cylindrical body 111 and flow out through the outlet 113.

In this way, the ultrasonic forming part 150 of the present exemplary embodiment provides ultrasonic waves to the dispersion medium moving along the path formed in the cylindrical body 111, making it possible to enable the dispersion phase to be dispersed into nanoparticles.

However, in order to accelerate the dispersion of the dispersion phase into the dispersion medium, that is, to enable the dispersion process from the dispersion phase into the dispersion medium to be performed in a concentrative way, the device of the present exemplary embodiment may further include the dispersion concentration part 160.

As shown in FIGS. 2 and 3, the dispersion concentration part 160 of the present exemplary embodiment is provided to partially surround the cooling water moving part 130 within the cylindrical body 111, and the dispersion phase, for example, oil moving through the dispersion phase moving part 140 is provided in the same manner as the present configuration to the dispersion region 110S where the process of dispersing the dispersion phase into the dispersion medium by the ultrasonic forming part 150 is taking place, so that the dispersion process in the dispersion medium may be accelerated. That is, the dispersion process can be performed in a concentrative way.

Referring to FIGS. 2 and 3, the dispersion phase moving part 140 provided adjacent to the cooling water moving part 130 penetrates the dispersion concentration part 160. With this, the dispersion phase moving through the dispersion phase moving part 140 may be provided into the dispersion concentration part 160.

The dispersion concentration part 160 injects the dispersion phase received from the dispersion phase moving part 140 into the dispersion region through a net structure formed on a side. With this, the fineness of the dispersion phase and the acceleration of dispersion can be assisted in the structure aspect.

The dispersion concentration part 160 of the present exemplary embodiment may be made of a material having pores 160h. For example, the dispersion concentration part may be provided as a nano-structured mesh net. Therefore, the dispersion phase moving along the dispersion phase moving part 140 may be evenly spread into the dispersion region 110S while passing through the pores 160h formed on the side of the dispersion concentration part 160.

The pores 160h formed in the dispersion concentration part 160 may have a uniform size, for example, from 10 µm or greater and 100 µm or less. With this, the dispersion phase can be evenly dispersed.

In addition, as described above, the dispersion medium and the dispersion phase, which are liquids of different types with different specific gravities, are positioned in the pores 160h formed in the dispersion concentration part 160, and thus, the residence time thereof can be increased. With this, the dispersion of the dispersion medium by the dispersion phase can be achieved more efficiently.

However, the structure and pore size of the dispersion concentration part 160 are not limited to the above, and it is natural that other structures can be applied as long as they can evenly disperse the dispersion phase.

Below, the dispersion of the dispersion phase into the dispersion medium by the configuration of the device 100 described above will be schematically described with reference to FIG. 4.

First, the dispersion medium is introduced through the inlet 112 of the device housing 110. At this time, cooling water is supplied through the cooling water moving part 130 in a direction of arrow A or in a reverse direction to cool the introduced dispersion medium.

When the dispersion medium moves in a direction of arrow B along the internal path of the cylindrical body 111, a current is applied to the ultrasonic forming part 150 to generate ultrasonic waves, and the generated ultrasonic waves are provided in a direction of arrow C to transfer energy to the dispersion phase through the dispersion medium passing through the dispersion region 110S, causing the dispersion phase to be dispersed into the dispersion medium.

At the same time, the dispersion phase provided through the dispersion phase moving part 140 can be provided to the dispersion region in a direction of arrow D through the dispersion concentration part 160, resulting in acceleration of the dispersion of the dispersion phase into the dispersion medium.

Below, a nanoparticle ultrasonic dispersion method of the nanoparticle ultrasonic dispersion device 100 according to an exemplary embodiment of the present invention will be described with reference to FIG. 5.

Figure 5:
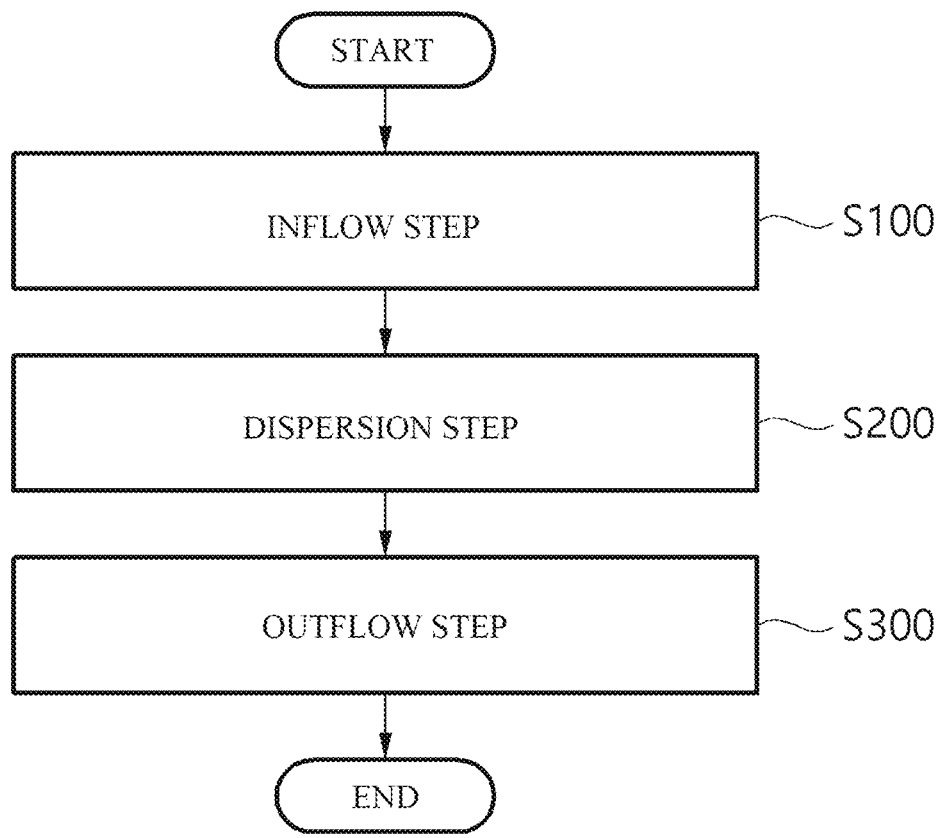
FIG. 5 is a flowchart of a nanoparticle ultrasonic dispersion method of a nanoparticle ultrasonic dispersion device according to an exemplary embodiment of the present invention.

FIG. 5 is a flowchart of a nanoparticle ultrasonic dispersion method of a nanoparticle ultrasonic dispersion device according to an exemplary embodiment of the present invention.

As shown, the nanoparticle ultrasonic dispersion method of the present exemplary embodiment may include an inflow step (S100) of causing a dispersion medium to flow in through the inlet 112 of the device housing 110; a dispersion step (S200) of dispersing a dispersion phase into the dispersion medium by operating the ultrasonic forming part 150 to generate ultrasonic waves on a moving path of the dispersion medium formed in the device housing 110; and an outflow step (S300) of causing the dispersion medium including the dispersion phase dispersed by the ultrasonic forming part 150 to flow out through the outlet 113 of the device housing 110.

Here, in the dispersion step (S200), the dispersion phase moving through the dispersion phase moving part 140 is provided into the dispersion medium through the dispersion concentration part 160 to accelerate dispersion of the dispersion phase into the dispersion medium by the ultrasonic forming part 150.

In the inflow step (S100) of the present exemplary embodiment, a cooling process for the dispersion medium that is dispersed within the device housing 110 during the dispersion step may be performed by providing cooling water through the cooling water moving part 130.

In this way, according to the present exemplary embodiment, dispersion of the dispersion phase into the dispersion medium can be efficiently achieved by providing ultrasonic waves to the dispersion medium through the ultrasonic forming part 150 and simultaneously providing the dispersion phase through the dispersion phase moving part 140. With this, the time required for dispersion can be shortened to increase process efficiency. In addition, with this configuration, the dispersion phase can be dispersed in the dispersion medium of large quantities, making it possible to increase the capacity of the device.

Although the specific exemplary embodiments according to the present invention have been described so far, it goes without saying that various modifications can be made without departing from the scope of the present invention. Therefore, the scope of the present invention should not be limited to the described exemplary embodiments, but should be determined by the scope of the claims described below as well as equivalents to the claims.

Although the present invention has been described with reference to the specific exemplary embodiments and the drawings, the present invention is not limited to the above exemplary embodiments. In addition, it will be appreciated by one skilled in the art to which the present invention pertains that various modifications and changes can be made from the above description. Accordingly, the spirit of the present invention should be understood only by the scope of the claims set forth below, and all equivalents or equivalent modifications thereof shall fall within the scope of the spirit of the present invention.

The invention claimed is:

1. A nanoparticle ultrasonic dispersion device comprising:
a device housing comprising a cylindrical body having an inlet through which a dispersion medium flows in and an outlet through which the dispersion medium after a dispersion work is completed flows out, and provided with a cooling water moving part through which cooling water flows in a center of the body and a dispersion phase moving part provided parallel to the cooling water moving part, a dispersion phase flowing through the dispersion phase moving part;
a focusing-type ultrasonic forming part provided to surround a central portion of the cooling water moving part on the device housing and configured to generate an ultrasonic wave to disperse the dispersion phase into the dispersion medium;
a dispersion concentration part provided to partially surround the cooling water moving part within the device housing and configured to accelerate the dispersion of the dispersion phase by the ultrasonic forming part,
wherein the dispersion phase moving part penetrates the dispersion concentration part, enabling the dispersion phase moving through the dispersion phase moving part to be dispersed into the dispersion medium through the dispersion concentration part, and
wherein the dispersion concentration part is a net having pores, and the dispersion phase moving along the dispersion phase moving part is provided into the dispersion medium while passing through the dispersion concentration part, making it possible to accelerate the dispersion of the dispersion phase into the dispersion medium.

2. The nanoparticle ultrasonic dispersion device of claim 1, wherein when the dispersion medium flowing into the device housing through the inlet passes between the ultrasonic forming part and the dispersion concentration part, while the dispersion phase is dispersed into the dispersion medium by the ultrasonic wave generated by the ultrasonic forming part, the dispersion phase dispersed through the dispersion concentration part accelerates dispersion into nanoparticles in the dispersion medium.

3. The nanoparticle ultrasonic dispersion device of claim 1, wherein the dispersion concentration part is made of a material having uniform pores of 10 μm or greater and 100 μm or less.

4. The nanoparticle ultrasonic dispersion device of claim 1, wherein the cylindrical body is provided in a hollow cylindrical shape where the cooling water moving part penetrates the center, and
wherein the ultrasonic forming part is provided in a cylindrical shape to surround the central portion of the cylindrical body, and an inner diameter of an internal space of the cylindrical body to which the ultrasonic forming part is mounted is relatively larger than an inner diameter of an internal space of the cylindrical body where the inlet and the outlet are provided.

5. The nanoparticle ultrasonic dispersion device of claim 1, wherein the ultrasonic forming part comprises a PZT vibrator.

6. The nanoparticle ultrasonic dispersion device of claim 1, wherein a specific gravity of the dispersion medium is different from a specific gravity of the dispersion phase.

7. The nanoparticle ultrasonic dispersion device of claim 1, wherein a material of the dispersion medium is of a different type from a material of the dispersion phase.

8. A nanoparticle ultrasonic dispersion method of the nanoparticle ultrasonic dispersion device according to claim 1, the nanoparticle ultrasonic dispersion method comprising:
causing a dispersion medium to flow in through the inlet of the device housing;
dispersing the dispersion phase into the dispersion medium by operating the ultrasonic forming part to generate an ultrasonic wave on a moving path of the dispersion medium formed in the device housing; and
causing the dispersion medium including the dispersion phase dispersed by the ultrasonic forming part to flow out through the outlet of the device housing,
wherein in the dispersing, the dispersion phase moving through the dispersion phase moving part is provided into the dispersion medium through the dispersion concentration part to accelerate the dispersion of the dispersion phase by the ultrasonic forming part,
wherein the dispersion concentration part is made of a material having pores, and
wherein in the causing a dispersion phase to flow in, a cooling process for the dispersion medium that is dispersed within the device housing in the dispersing is performed by providing cooling water through the cooling water moving part.

9. The nanoparticle ultrasonic dispersion method of claim 8, wherein a specific gravity of the dispersion medium is different from a specific gravity of the dispersion phase.

10. The nanoparticle ultrasonic dispersion method of claim 8, wherein a material of the dispersion medium is of a different type from a material of the dispersion phase.

* * * * *